United States Patent [19]
Damm et al.

[11] 3,742,219
[45] June 26, 1973

[54] HIGH ENERGY NEUTRAL PARTICLE BEAM SOURCE

[75] Inventors: Charles C. Damm; John E. Osher, both of Alamo; Richard F. Post, Walnut Creek, all of Calif.

[73] Assignee: The United States of America as represented by the United States Atomic Energy Commission, Washington, D.C.

[22] Filed: June 23, 1971

[21] Appl. No.: 155,984

[52] U.S. Cl. .................................. 250/84, 250/41.3
[51] Int. Cl. .............................................. H01j 37/00
[58] Field of Search ........................... 250/41.3, 84; 313/63

[56] References Cited
UNITED STATES PATENTS
3,571,642  3/1971  Westcott .............................. 313/63
3,136,908  6/1964  Weinman ............................. 313/63
3,424,905  1/1969  Donnally ............................. 250/84
3,657,542  4/1972  Futch, Jr. et al ................... 250/84

*Primary Examiner*—William F. Lindquist
*Attorney*—Roland A. Anderson

[57] ABSTRACT

An ion source directs a beam of low energy positive ions through a first gas charge exchange cell forming a beam of neutral particles with some negative ions therein. The neutral particle component of the beam is then directed through an aligned series of similar charge exchange cells in each of which some of the neutral particles are converted into negative ions. A magnetic field is applied to the mixed particle beam emerging from each cell to deflect the negative ions so as to converge to form a common negative ion beam which is passed through a charged particle accelerator to yield a high energy negative ion beam then through a gas cell to strip electron therefrom forming a high energy neutral particle beam which may then be directed into the magnetic containment zone of a controlled fusion reactor to be ionized and trapped to form a plasma therein.

9 Claims, 2 Drawing Figures

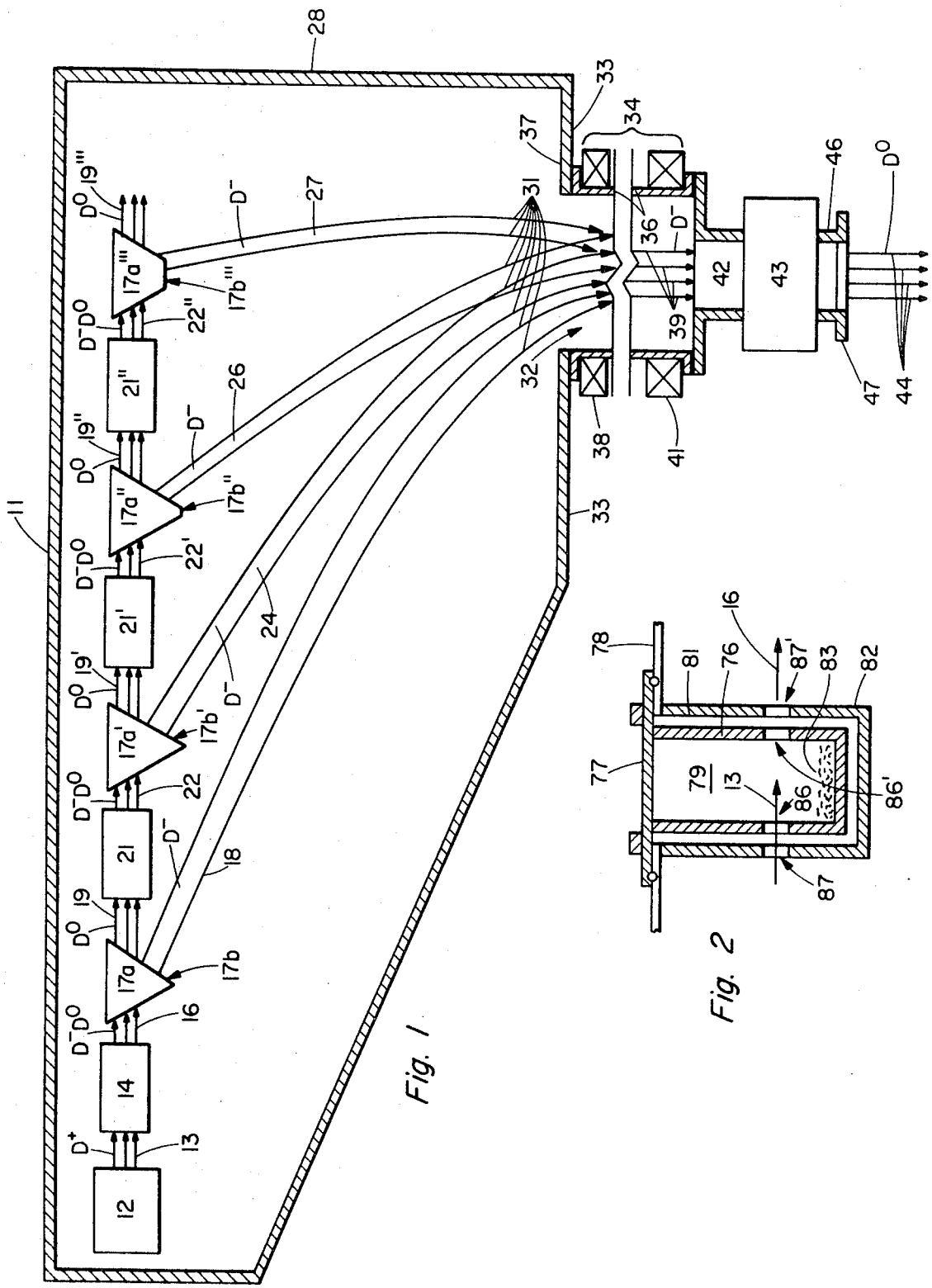

HIGH ENERGY NEUTRAL PARTICLE BEAM SOURCE

BACKGROUND OF THE INVENTION

The invention disclosed herein was made under, or in the course of Contract No. W-7405-ENG-48 with the United States Atomic Energy Commission.

Arrangements for producing energetic neutral particle beams are employed in controlled fusion reactor practice for injecting fusionable fuel materials into the magnetic containment zone of such a reactor. Energetic neutral particles are able to penetrate the magnetic field of such a reactor and enter the containment zone defined therein wherein collisional interaction with background gas, plasma particles or Lorentz force interaction are effective to remove an electron creating a fusionable fuel nuclide ion which is trapped therein to form or augment the fusion reaction plasma therein. Heretofore, energetic neutral particle beams have been produced in a system in which energetic positive ions, produced in an ion source or ion source-accelerator combination, are directed through a gas or vapor charge exchange cell wherein they interact yielding a beam of energetic neutral particles with a major proportion of unneutralized positive ions remaining therein. The positive ions may be deflected therefrom by means of magnetic fields leaving an energetic neutral particle beam. Arrangements of this type are disclosed, for example, in U.S. Pat. No. 3,152,959, issued Oct. 13, 1964 to Charles C. Damm, for "Injection Method and Apparatus for Controlled Fusion Devices." In such arrangement the energetic neutral particles are produced by interaction of energetic positive ions with a charge exchange medium such as hydrogen, helium, nitrogen or water vapor. Details of construction and operation of an arrangement for producing beams of excited state energetic neutral particles are disclosed in the copending application of Archer H. Futch, Jr., et al., Ser. No. 34,282(70) filed May 4, 1970 for "Production of Beams of Excited Energetic Neutral Particles." While systems such as the foregoing may effectively produce energetic neutral particles having energies below about 100 keV, neutralization efficiency of positive ions decreases at energies above about 100 keV. More effective means for producing high energy neutral particles, particularly in the large particle current amperages required in large scale power producing fusion reactors would be highly beneficial and of material value in improving the overall efficiency of controlled fusion reactors.

SUMMARY OF THE INVENTION

The invention relates, generally, to apparatus for producing beams of energetic neutral particles and, more particularly, to apparatus for producing energetic neutral particle beams in which there is first produced a plurality of negative ion beams which are then combined and accelerated to provide a high energy negative ion beam which is then passed through a neutralizer cell to produce a beam of energetic neutral particles with greatly improved efficiency.

Certain light nuclides, i.e., $^1H$, $D$, $T$, $^3He$ and $^6Li$, alone or in certain admixtures are most commonly considered as fusionable fuels for use in a controlled fusion reactor. The reactions of principal interest include the following:

1. $D + T \rightarrow He^4 + n$

2. $D + D \rightarrow \begin{array}{l} \rightarrow {}^3He + n \\ \rightarrow T + H \end{array}$ 3. $D + {}^3He \rightarrow {}^4He + H$ In certain types of fusion reactors, i.e., those having static magnetic containment fields, the indicated materials are injected as neutral atomic particles, e.g., $D^0$, $T^0$, $^3He^0$, etc., having sufficient kinetic energy to provide a suitable reaction temperature when trapped in the magnetic containment zone of the reactor. Temperatures corresponding to as low as about 70 keV for the first mentioned reaction to as high as about 500 to 600 keV for the last mentioned reaction are generally considered suitable. With the first two reactions, reaction rates may be increased using higher energy particles.

For producing the requisite energetic neutral particles in the source of the invention, an ion source of conventional design is employed to create a beam of relatively low energy positive ions, e.g., $D^+$, $T^+$, $^3He^+$, etc. Ions having energies in the range of about 1 keV to at least about 20 KEV may be used. The beam of low energy ions is directed through a neutralizer cell wherein a gaseous or vaporous target charge exchange medium is disposed across the beam path at an appropriate density. Therein the positive ions interact with the molecules of the charge exchange medium to undergo a charge exchange reaction with the majority of the ions, under resonant charge exchange conditions, acquiring an electron to become a low energy neutral atomic particle and a lesser proportion, usually with about, 15 percent to about 25 percent, typically 20 percent, acquiring two electrons to become negative atomic particles, which neutral and negative atomic particles emerge as a beam from the neutralizer cell. A magnetic deflection field is applied across the mixed beam path at the exit of the neutralizer cell to deflect the negative ions therefrom and neutral particles remaining in the beam are then directed through a sequential series of spaced aligned cells similar to the neutralizer cell wherein successive portions of the neutral particles acquire additional electrons to become low energy negative ions. Magnetic fields are applied across the beam path between the successive pairs of negative ionization cells to deflect the negative ions produced in each cell as with the first cell. The magnetic deflection fields are designed and arranged to direct the beams of deflected negative ions to converge to form a common negative ion beam and the common negative ion beam is then directed into the input end of a charged particle accelerator. The low energy negative ions are accelerated therein to a kinetic energy corresponding to the desired fusion reaction temperature and emerge from the accelerator as a relatively high energy negative ion beam. Such negative ion beam, in turn, is directed to pass through a charge exchange stripper cell wherein the negative ions interact with a gaseous or vaporous medium so as to lose an electron and thereby be converted into the desired relatively high energy neutral particle beam. Said beam is then directed into the magnetic containment zone of a fusion reactor to be ionized and trapped to form a high temperature plasma. The efficiency of producing energetic neutral particles is several times better than in systems merely using neutralization of high energy positive ions, e.g., to as much as above about 50 percent compared to about 6 percent in the case of 500 keV deuterons.

Accordingly, it is an object of the invention to provide improved means for generating high energy neutral particle beams.

Another object of the invention is to provide improved apparatus for generating high energy beams of neutral fusionable light nuclide particles for injection into a controlled fusion reactor.

Still another object of the invention is to provide apparatus for producing a beam of energetic neutral particles wherein a low energy beam of positive light nuclide ions is converted into a beam of low energy negative ions which are then accelerated to a high energy and the high energy negative ions are passed through a deionizer cell to produce said beam of energetic neutral particles.

Other objects and advantageous features of the invention will be apparent in the following description taken in conjunction with the accompanying drawing, of which:

FIG. 1 is a plan view partially in cross section illustrating a high energy neutral particle beam source in accordance with the invention; and FIG. 2 is a cross-sectional view of a metallic vapor charge exchange neutralizer or electron stripper cell suitable for use in the apparatus of FIG. 1.

DETAILED DESCRIPTION OF THE INVENTION

Components required for producing the common low energy negative ion beam may be disposed within an elongated vacuum vessel 11 provided with appropriate vacuum pump means (not shown) and of generally rectangular cross section as shown in FIG. 1 of the drawing. More particularly, an ion source 12 of conventional design is arranged, within one end region of vessel 11, to direct a beam 13 of relatively low energy positive fusionable nuclide ions 13, for example $D^+$ ions, along a linear beam path extending longitudinally within vessel 11. The ion source may be of any appropriate type which is capable of yielding a well collimated beam, for example, a Duo-Plasmatron type disclosed in "Plasma Physics and Thermonuclear Research" Series XI, Progress in Nuclear Energy Pergammon Press, 1963, a "Calutron" type ion source or the like commonly used in controlled fusion reactors. Preferably, the ion source is one such as the "MATS" ("Multiple Aperture Test Source" disclosed in UCRL-50002-70 of the U. S. Atomic Energy Lawrence Radiation Laboratory for the period July 1, 1969 through June 30, 1970). It will be appreciated that other low energy positive ions such as $^1H^+$, $T^+$, $^3He^+$, $^6Li^+$ of fusionable light nuclides contemplated for use in fusion reactors may be produced similarly. The beam 13 is directed through a charge exchange cell 14 arranged in alignment along said beam path wherein the positive ions interact with a suitable charge exchange medium to yield a beam segment 16 comprising relatively low energy neutral particles, e.g., $D^o$ with a fractional proportion of low energy negative ion particles, e.g., $D^-$ therein.

Generally speaking, to obtain optimum conversion, the energy of the ion beam and nature of the charge exchange medium are selected to attain resonant charge exchange conditions. For example, using cesium vapor as the charge exchange medium, an energy dependent resonance exists at about 1.5 keV for $D^+$, 750 eV for $H^+$ and at about 2.25 keV for $T^+$. The resonance peak in this case is fairly broad with operation still being optimized over a range of about 100 eV above and below the indicated values. Target conditions of about $2\times10^{15}$ cesium vapor atoms per square centimeter is near optimum with about 20 percent conversion while cesium vapor densities over the range of about $1\times10^{15}$ to about $3\times10^{15}$ cesium vapor atoms per square cm results in about 15 percent to about 22 percent conversion, respectively. The small gain in going from $2\times10^{15}$ to $3\times10^{15}$ atoms square cm density is generally offset by a larger scattering loss so that a density of about $2\times10^{15}$ atoms square cm is preferred which value also corresponds to a target thickness of about 57 milli torr cm with a commensurate range of about 20–70 milli torr cm. Although operation under resonance charge exchange conditions may be preferred, operation under non-resonant conditions is also feasible and must be used, for example, if suitable resonances do not exist with particular materials. Operation in this case is feasible over a range of at least about 1 keV TO 20 keV; however, conversion will generally be reduced one to two orders of magnitude in such case. With higher energy positive ions scattering losses are reduced substantially so as to offset decreased conversion effectiveness. Other charge exchange media which may be employed include other alkali metal vapors, i.e., of sodium, potassium, rubidium and other known media, if lower conversion proportions can be tolerated or if no better exists.

The beam segment 16 emerging from cell 14 and comprising low energy neutral and negative ion particles, e.g., $D^o$ and $D^-$, are directed along said linear beam path to enter the magnetic field created by beam bending magnet pole pieces 17a, 17b wherein the negative ions, e.g., $D^-$ are deflected as a beam 18 along a path angularly inclined to said linear beam path. The energetic neutrals, e.g., $D^o$ continue as a beam segment 19 along said linear beam path. Beam segment 19 is directed through at least one additional charge exchange cell 21 similar to cell 14, which converts a portion of the low energy neutral particles, e.g., $D^o$ to a negative ion, e.g., $D^-$ yielding a second beam segment 22 comprising low energy neutral particles and low energy negative ions, e.g., $D^o$ and $D^-$. Generally, to achieve maximum conversion a plurality of two to about ten of such cells, e.g., 21, 21', 21'', etc., are arranged in spaced sequential relation along said linear path yielding beam segments 22, 22', 22'', etc., respectively, comprising low energy neutral and negative ion particles. The foregoing beam segments 22,22',22'', etc., are passed through magnet fields created by beam bending paired magnet pole pieces 17a', 17b', 17a'', 17b'', 17a''', 17b''', etc. disposed in juxtaposition across the linear beam path spaces between charge exchange cells 21, 21' and 21'' and at the exit end of cell 21''' so as to deflect negative ions, e.g., $D^-$ from beam segments 22, 22', 22'', etc., to follow beam paths 24, 26, 27, etc., respectively. Residual low energy neutrals, e.g., $D^o$ in beam segments 19' and 19'' emerging from the magnetic fields of pole piece pairs 17a', 17b' and 17a'', 17b'', respectively are directed into cells 21' and 22'', respectively, while beam segment 19''' is directed into a further charge exchange cell, if used, or it may be collected in a "beam dump" arrangement or otherwise disposed of if no longer of sufficient intensity to warrant further processing. For example, beam segment 19''' may be allowed merely to impinge on the end wall 28 of vessel 11 or onto a target (not shown)

affixed thereto. Particle scattering losses tend to limit the number of negative ion to neutral particle conversion cells to a maximum of about 10 in number.

The characteristics of the beam bending magnets are selected to cause the negative ion beam paths 18, 24, 26 and 27 to converge in an appropriate region in the enlarged end portion of vessel 11 to form a common negative ion beam 31 suitable for passage through a particle accelerator. More specifically, a port 32 may be provided in sidewall 33 of vessel 11 for passage of negative ion beam 31 therethrough. A charged particle accelerator 34 may then be arranged to receive the common negative ion beam 31. For this purpose, the vacuum housing 36 of the accelerator 34 may be coupled by means of a flanged joint 37 to the port 32. Then a magnetic field may be created at the entrance of the accelerator and in proximate regions of the reactor vessel as by an electrically energized solenoid 38 disposed concentrically to said entrance to serve to gather and collimate or focus the negative ion beam 31 for passage through the accelerator 34. Various beam guiding techniques known in the art may be used similarly. The accelerator may be of a conventional electrostatic potential accelerating type or of any other equivalent type suitable for accelerating a beam of negative ions. For practical construction reasons linear accelerator arrangements are usually preferred. The accelerated negative ion beam 39, produced by the accelerator, may be focused and collimated by means of a magnetic field created by an electrically energized solenoid 41 disposed concentrically about the beam path at the exit end of the accelerator.

The collimated beam 39 of relatively high energy negative ions, e.g., $D^-$ may then be discharged from the accelerator through a beam tube 42 and passed through a charge exchange electron stripper cell 43 to strip an electron therefrom to produce a beam 44 of relatively high energy neutral particles, e.g., $D^o$. More specifically, beam 44 may be directed through a beam tube 46 having a terminal flange 47 adapted to be connected to a beam input port (not shown) of a controlled fusion reactor vacuum vessel as in conventional practice. The vapor density of the charge exchange medium in the stripper cell may be somewhat higher in density, i.e., about 3 to $5 \times 10^{15}$ atoms per square cm. Cs, K, Rb vapor may be used as may hydrogen gas or $H_2O$ vapor and other charge exchange media. Densities as low as about $2 \times 10^{15}$ atoms sq/cm are operable with less efficiency. The acceleration characteristics of the accelerator are selected to provide energetic neutral particles of whatever energy contemplated use of the beam may require. For example, beams of energetic neutral particles having energies as low as about 10 keV may be created for use in experimental research controlled fusion reactors. However, the marked advantages of the present energetic neutral particle source may be realized in larger measure in higher energy reactors where injected particle energies may be in the range of about 70 keV to about 1.5 MeV or more, i.e., at an elevated energy range where conventional procedures diminish significantly in efficiency.

In practice the energetic neutral particle source of the invention may, for example, be substituted for the source disclosed in the aforesaid U. S. Patent of Charles C. Damm typically used in ALICE type magnetic mirror controlled fusion devices. The source may also be used in large scale power producing controlled fusion reactors as well as in smaller scale reactor using Tennis or Baseball Seam electromagnet coils disclosed in the Proceedings of the Second International Conference on Magnet Technology, Oxford, England, July, 1967. The source may also be used in Yin-Yang coil type controlled fusion reactors disclosed, inter alia, in U. S. application Ser. No. 881,787, filed Dec. 3, 1969, by Richard F. Post and Ralph W. Moir for "Electromagnetic Apparatus for Producing and Containing High Temperature Plasmas"; U. S. application Ser. No. 63,582(70) filed Aug. 13, 1970, by Richard F. Post for "Conversion of High Temperature Plasma Energy into Electrical Energy"; and U. S. application Ser. No. 72,294(70), filed Sept. 15, 1970 by Ralph W. Moir for "Apparatus for the Conversion of High Temperature Plasma Energy into Electrical Energy."

Details of construction and operation of charge exchange gas cell and of cells utilizing alkali and alkaline earth metal vapors are well known in the art. As noted hereinbefore such details are set forth, inter alia, in the copending application of Archer H. Futch, Jr., et al., Ser. No. 34,282(70) filed May 4, 1970, the disclosure of which application is incorporated by reference. In brief such a vapor neutralizer cell 75 as shown in FIG. 2 may comprise a closed vessel portion 76 suspended from a cover plate 77 secured, e.g., in sealed relation to the periphery of an opening in the upper wall 78 of vessel 11 and defining a chamber 79 therein. Electrical heating elements 81 and a heat shield 82 are arranged circumjacent to the sidewalls and bottom of vessel 76 to provide heat and a controllable temperature in vessel 76 to generate vapor from cesium, potassium or rubidium chips 83 disposed on the bottom wall of vessel 76 to provide the desired vapor density of the charge exchange medium in chamber 79. Aligned openings 86, 87, 86', 87' are provided in the sidewalls of vessel 76 and heat shield 81, respectively, to allow the respective ion or neutral particle-ion beam to traverse chamber 79 of said cell, e.g., cell 14. The vapor density in chamber 79 is regulated to a level by controlling the temperature of chamber 79 which correlated with the length of the beam path therethrough yields the desired target thickness of the charge exchange media. A gaseous medium (not shown), e.g., hydrogen water vapor may also be provided in chamber 79 or a charge exchange cell such as those disclosed in the above-referenced U. S. Patent to C. C. Damm may be used for stripper cell 43.

Typical operating parameters are disclosed in the following illustrative example:

EXAMPLE

For producing a 500 kev energetic neutral deuterium atom particle beam:
Initial beam $D^+$ ions 1.5 keV ± 100 eV
Neutralizer cells 5
Charge exchange medium cesium vapor at $2 \times 10^{15}$ atoms/sq. cm density
Accelerator approx 500 keV
Electron stripper cell charge exchange medium cesium vapor at $3 \times 10^{15}$ to
$5 \times 10^{15}$ atoms/sq. cm density
Approximately 50 percent or more $D^+$ converted to $D^-$
Approximately 80 percent of $D^-$ converted to $D^o$ in stripper cell
    90 percent of $D^-$ converted to $D^o$ plasma stripping cell While there has been disclosed in the foregoing what may be considered to be preferred embodiments, modifications may be made therein without departing from the teachings of the invention and it is intended to cover all such a fall within the scope of the appended claims.

What we claim is

1. Apparatus for producing a single beam of energetic neutral light nuclide particles comprising:
    a single positive ion source for producing and directing a beam of relatively low energy positive ions of said light nuclide along a beam path;
    a first charge exchange cell disposed along said beam path having a first charge exchange medium disposed therein effective to interact with and convert a substantial proportion of said positive ions into a beam of relatively low-energy neutral and negative ion particles traveling along said beam path;
    at least one additional charge exchange cell disposed sequentially in spaced relation to said first charge exchange cell along said beam path and having a charge exchange medium disposed therein effective to interact with and convert a proportion of said low-energy neutral particles into negative ion particles traveling as a beam together with residual neutral particles along said beam path;
    means for applying a magnetic field to each of the spacial regions between said charge exchange cells and at the exit to the last of said cells effective to deflect said negative ions from said beam path to beam paths which converge in a common region;
    means for focusing said ions in said common region to form a combined beam of negative ions directed along a common beam path;
    accelerator means disposed along said common beam path for accelerating said low-energy negative ions to provide a single beam of relatively high-energy negative ions traveling along said common beam path; and
    charge exchange stripper cell means disposed along said common beam path having a charge exchange medium disposed therein effective to interact with said relatively high-energy negative ions to strip an electron therefrom to yield a single beam of relatively high-energy neutral particles traveling along said common beam path.

2. Apparatus as defined in claim 1 wherein said charge exchange medium disposed in the first and in the additional charge exchange cell comprises vapor of a material selected from the group consisting of cesium, sodium, potassium and rubidium and said positive ions comprise a material selected from the group consisting of $^1H^+$, $D^+$, $T^+$, $^3He^+$ and $^6Li^+$.

3. Apparatus as defined in claim 1 wherein said charge exchange medium disposed in the first and additional charge exchange cell comprises cesium metal vapor and said positive ions comprise a material selected from the group consisting of $^1H^+$, $D^+$ and $T^+$ having energies in the range of about 750 eV ± 100 eV, 1.5 keV ± 100 eV and 2.25 keV ± 100 eV, respectively, wherefor resonant charge exchange occurs to produce enhanced proportions of $D^-$ ions in the exit beams therefrom.

4. Apparatus as defined in claim 3 wherein the density of said charge exchange medium is in the range of about $1 \times 10^{15}$ to about $3 \times 10^{15}$ cesium atoms per square cm.

5. Apparatus as defined in claim 4 wherein the density of said charge exchange medium is about $2 \times 10^{15}$ cesium atoms square cm.

6. Apparatus as defined in claim 4 wherein the charge exchange medium in said charge exchange stripper cell means comprises a gaseous or vapor form of a material selected from the group consisting of cesium, potassium, rubidium, hydrogen and water.

7. Apparatus as defined in claim 4 wherein said additional charge exchange cell is employed in numbers in the range of 1 to about 6 individual cells disposed in sequential spaced arrangement along said beam path.

8. Apparatus as defined in claim 4 wherein said accelerator means is adapted to accelerate said negative ions to an energy level in the range of about 100 keV to about 1.5 MeV.

9. Apparatus as defined in claim 8 including a vacuum vessel enclosing the components defined therein, said vacuum vessel having a beam exit port adapted for coupling to the vacuum vessel of a controlled fusion reactor, said port defining an opening permitting passage of said energetic neutral particle beam into the vacuum vessel of said reactor.

* * * * *